United States Patent
Ren et al.

(10) Patent No.: US 12,512,682 B2
(45) Date of Patent: *Dec. 30, 2025

(54) FEEDBACK CURRENT CONTROL DEVICE AND AERIAL PLATFORM TRUCK

(71) Applicant: Zoomlion Intelligent Access Machinery Co., Ltd., Changsha (CN)

(72) Inventors: Huili Ren, Changsha (CN); Yi Zhong, Changsha (CN); Hou Zhu, Changsha (CN); Lu Xiong, Changsha (CN); Weiping Sun, Changsha (CN)

(73) Assignee: ZOOMLION INTELLIGENT ACCESS MACHINERY CO., LTD., Changsha (CN)

( * ) Notice: Subject to any disclaimer, the term of this patent is extended or adjusted under 35 U.S.C. 154(b) by 852 days.

This patent is subject to a terminal disclaimer.

(21) Appl. No.: 17/790,598

(22) PCT Filed: Mar. 30, 2021

(86) PCT No.: PCT/CN2021/084038
§ 371 (c)(1),
(2) Date: Jul. 1, 2022

(87) PCT Pub. No.: WO2022/027984
PCT Pub. Date: Feb. 10, 2022

(65) Prior Publication Data
US 2023/0037348 A1    Feb. 9, 2023

(30) Foreign Application Priority Data
Aug. 3, 2020  (CN) .......................... 202010768953.8

(51) Int. Cl.
*H02J 7/00* (2006.01)
*B60L 3/00* (2019.01)

(52) U.S. Cl.
CPC ........ *H02J 7/00309* (2020.01); *B60L 3/0046* (2013.01); *H02J 7/007194* (2020.01); *H02J 7/0048* (2020.01)

(58) Field of Classification Search
CPC ............ H02J 7/00309; H02J 7/007194; H02J 7/0048; H02J 2310/48; H02J 7/007182;
(Continued)

(56) References Cited

U.S. PATENT DOCUMENTS

2014/0084820 A1    3/2014  Modolo
2016/0059857 A1    3/2016  Ikedaya et al.
(Continued)

FOREIGN PATENT DOCUMENTS

CN    206650483 U    11/2017
CN    107512179 A    12/2017
(Continued)

*Primary Examiner* — Julian D Huffman
*Assistant Examiner* — Aiman Bickiya
(74) *Attorney, Agent, or Firm* — Volpe Koenig

(57) ABSTRACT

The invention relates to a feedback current control device and aerial equipment. The feedback current control device includes: a feedback current capture module, located on a current capture circuit and configured to capture a feedback current; a first switch module, configured to turn on or off the current capture circuit; and a control module, including: a first receiving unit, configured to receive a first voltage at one end of the driver and a second voltage at one end of a battery on a feed circuit and a temperature of the battery; and a first control unit, configured to control the first switch module to turn on the current capture circuit for capturing the feedback current when the difference between the first voltage and the second voltage is greater than a preset voltage and the temperature of the battery is less than or equal to a preset temperature.

12 Claims, 3 Drawing Sheets

(58) Field of Classification Search
CPC .... H02J 7/1446; H02J 7/1492; H02J 7/00302; B60L 3/0046; B60L 2200/44; B60L 2240/429; B60L 1/20; B60L 7/22; B60L 15/2018; B60L 58/15; B60L 58/24; B60L 2240/545; B60L 2240/547; B60L 2240/549; B60L 53/22; B60L 7/10; Y02T 10/92
USPC ........................................................ 320/109
See application file for complete search history.

(56) References Cited

U.S. PATENT DOCUMENTS

| | | |
|---|---|---|
| 2017/0354087 A1 | 12/2017 | Yamagishi et al. |
| 2018/0186355 A1 | 7/2018 | Harvey et al. |
| 2019/0077267 A1 | 3/2019 | Song |

FOREIGN PATENT DOCUMENTS

| | | | | |
|---|---|---|---|---|
| CN | 108973780 A | * | 12/2018 | ............. B60L 15/20 |
| CN | 209600281 U | | 11/2019 | |
| CN | 110549912 A | | 12/2019 | |
| CN | 111409465 A | | 7/2020 | |
| CN | 111525656 A | * | 8/2020 | .......... H02J 7/00302 |
| CN | 112078368 A | | 12/2020 | |
| CN | 112259829 A | | 1/2021 | |
| CN | 112260342 A | | 1/2021 | |
| EP | 4064420 A1 | | 9/2022 | |
| JP | 2010183667 A | | 8/2010 | |

* cited by examiner

FEEDBACK CURRENT CONTROL DEVICE AND AERIAL PLATFORM TRUCK

CROSS REFERENCE TO RELATED APPLICATIONS

This application is a 35 U.S.C. § 371 national stage of PCT/CN2021/084038, which is titled "FEEDBACK CURRENT CONTROL DEVICE AND AERIAL PLATFORM TRUCK" and claims the benefit of Chinese Patent Application No. 202010768953.8, filed on Aug. 3, 2020, both of which are incorporated herein by reference as if fully set forth.

FIELD OF THE INVENTION

The present invention relates to the technical field of engineering machinery, and in particular to a feedback current control device and an aerial equipment.

BACKGROUND OF THE INVENTION

Since an electrically driven aerial equipment (self-propelled) is usually not equipped with a mechanical friction brake, this aerial equipment slows down or stops depending on an energy feedback type regenerative braking technique. However, the regenerative braking technique has the following two characteristics: 1. a walking motor driver serves as both an inverter and a rectifier, when the aerial equipment slows down or goes downhill, kinetic energy is converted into electric energy, and the electric energy is then fed back to a power battery; 2. since the slowdown time and braking time of the aerial equipment are generally short and a maximum speed is generally 6 KM/H or so, the braking usually generates a high instantaneous pulse feedback current. Therefore, in operating conditions (for example, spraying/brushing or transitions in a construction site) that the aerial equipment needs to stop and go alternately, the pulse feedback current will be generated at a higher frequency.

For an electrically driven aerial equipment using a lithium-ion power battery, a large number of experimental results show that when the temperature of the power battery is lower than 0° C., the pulse feedback current leads to large-area lithium precipitation in a negative plate of the battery. Lithium precipitation may reduce the capacity of the power battery, and in severe cases, lithium dendrites may be produced to pierce a membrane, which further causes a short circuit inside the battery. If the battery is short-circuited in a large area, there is a risk of thermal runaway. Therefore, it is necessary to take strong measures to avoid the risk caused by pulse charging at low temperature.

In order to avoid the risk caused by pulse charging at low temperature, a heating device is usually configured inside a battery. When the battery is charged at low temperature, a battery management system (BMS) uses a charger to supply electricity to the heating device, and the heating device heats the battery to an appropriate temperature. Thus, when slowing down or going downhill, the electrically driven aerial equipment performs braking by utilizing the regenerative braking technique, and the generated feedback current can directly flow into the battery at an appropriate temperature. However, limited by many factors, the power of the heating device is not high, and the temperature rise rate is usually around 10° C./h. When the temperature is low, it will take a long time to heat the battery, which affects the customer's use of the equipment. In addition, since the aerial equipment usually works intermittently with long shutdown intervals, the temperature of the battery is difficult to maintain (it cannot be guaranteed that the temperature of the battery is kept to be 0° C. or above all the time when the battery is discharged), so this technique does not achieve a good effect, and provides a poor user experience. Therefore, the prior art brings in an extremely limited effect on reducing the risk caused by pulse charging at low temperature.

SUMMARY OF THE INVENTION

An objective of the present invention is to provide a feedback current control device and an aerial equipment configured with the feedback current control device, which can effectively avoid the risk of lithium precipitation of a battery caused by a pulse feedback current when charging is performed at low temperature, thereby greatly reducing the probability of lithium precipitation of the battery and the risk of thermal runaway of the battery and enhancing the safety of the battery.

In order to achieve the above objective, in an aspect of the present invention, a feedback current control device is provided. A power circuit between a driver and a battery includes: a feed circuit configured to to supply electricity to the driver from the battery; and a current capture circuit configured to divide a feedback current delivered by the driver. The feedback current control device includes: a feedback current capture module, located on the current capture circuit and configured to capture the feedback current; a first switch module, located on the current capture circuit and configured to turn on or off the current capture circuit; and a control module. The control module includes: a first receiving unit, configured to receive a first voltage at one end of the driver and a second voltage at one end of the battery on the feed circuit and a temperature of the battery; and a first control unit, configured to, according to a difference between the first voltage and the second voltage and the temperature of the battery, perform the following operations: controlling the first switch module to turn on the current capture circuit under the condition that the difference between the first voltage and the second voltage is greater than a preset voltage and the temperature of the battery is less than or equal to a preset temperature, such that the feedback current is captured by the feedback current capture module.

Optionally, wherein the power circuit further comprises: a charging circuit configured to deliver feedback current to the battery by the driver, the charging circuit being connected in parallel with the feed circuit, the feedback current control device further comprises: a second switch module, located on the charging circuit and configured to turn on or off the charging circuit, the control module further comprises: a second receiving unit, configured to receive a present allowable charging current of the battery, and the first control unit is further configured to, under the condition that the difference between the first voltage and the second voltage is greater than the preset voltage and the temperature of the battery is greater than the preset temperature, to perform the following operations: controlling the second switch module to turn on the charging circuit; and controlling the first switch module to turn on the current capture circuit, and controlling the driver to charge the battery with the present allowable charging current and through the charging circuit by regulating on-off time of the first switch module.

Optionally, further comprising: a third switch module, located on the feed circuit, connected in parallel with the second switch module, and configured to unidirectionally turn on the feed circuit so as to only allow the battery to supply electricity to the driver.

Optionally, wherein the second switch module is a contactor, a combination of a first diode and a contactor connected in series, or a first field-effect transistor.

Optionally, wherein the first field-effect transistor has a first chip, and the control module further comprises: a second control unit, configured to, under the condition that the third switch module fails, control the first chip of the first field-effect transistor to unidirectionally turn on the charging circuit so as to only allow the battery to supply electricity to the driver.

Optionally, wherein the first switch module is a second field-effect transistor; and the third switch module is a second diode or a third field-effect transistor, wherein the third field-effect transistor has a second chip, and correspondingly, the control module further comprises: a third control unit, configured to control the second chip of the third field-effect transistor to unidirectionally turn on the feed circuit so as to only allow the battery to supply electricity to the driver.

Optionally, wherein the feedback current control device further comprises: a bypass switch, wherein the bypass switch is connected in parallel with the second switch module, and the control module further comprise: a fourth control unit, configured to, under the condition that the second switch module and the third switch module both fail, control the bypass switch to be closed such that the battery supplies electricity to the driver.

Optionally, wherein the control module further comprises: a determining unit, configured to determine an electricity generation current of an electric motor according a target speed of the electric motor, an actual speed of the electric motor and braking time of an aerial equipment; and a sending unit, configured to send the determined electricity generation current to the driver, so as to allow the driver to control the electric motor to generate electricity with the electricity generation current.

Optionally, wherein the determining unit configured to determine the electricity generation current comprises: determining that the electricity generation current is a maximum electricity generation current under the condition that the target speed, the actual speed and the braking time satisfy a preset condition, wherein the preset condition is that the braking time is less than preset braking time or a difference between the target speed and the actual speed is greater than a preset speed difference; or determining the electricity generation current according to a minimum electricity generation current, a maximum allowable braking time and the maximum electricity generation current under the condition that the target speed, the actual speed and the braking time do not satisfy the preset condition.

Optionally, wherein the feedback current capture module is an energy consumption module or an energy storage module.

Optionally, wherein the energy consumption module is a braking resistor.

According to the above technical solution, in an inventive way, the first switch module is used to turn on the feedback current capture module to capture the feedback current under the condition that the difference between the first voltage at one end of the driver and the second voltage at one end of the battery on the feed circuit is greater than the preset voltage and the temperature of the battery is less than the preset temperature (for example, 0° C.). Thereby, when charging is performed at low temperature, the feedback current capture module can capture all the feedback currents, so that the risk of lithium precipitation of the battery caused by a pulse feedback current when charging is performed at low temperature can be effectively avoided, further, the probability of lithium precipitation of the battery and the risk of thermal runaway of the battery are greatly reduced, and the safety of the battery is enhanced.

In a second aspect of the present invention, an aerial equipment is provided. The aerial equipment includes: the above feedback current control device.

Other features and advantages of the present invention will be described in detail in the Detailed Description below.

BRIEF DESCRIPTION OF DRAWINGS

The accompanying drawings are intended to provide a further understanding of the present invention, constitute a part of the specification, are used to explain the present invention together with the specific embodiments below, but are not intended to limit the present invention. In the accompanying drawings.

DESCRIPTION OF REFERENCE SIGNS

| 10 | Second switch module | 12 | Contactor |
|---|---|---|---|
| 14, 52, 72 | MOS transistor | 20 | Driver |
| 30 | Battery | 40 | Feedback current capture module |
| 42 | Braking resistor | 50 | First switch module |
| 60 | Control module | 62 | First receiving unit |
| 64 | First control unit | 66 | CPU |
| 70 | Third switch module | 80 | Electric motor |
| | | 100, 110 | Voltmeter |
| 90 | Bypass switch | 130 | A/D converter |
| 120 | CAN controller | | |
| 140 | BMS | | |

DETAILED DESCRIPTION OF THE EMBODIMENTS

Specific embodiments of the present invention will be described in detail below in conjunction with the accompanying drawings. It should be understood that the specific embodiments described herein are merely used to illustrate and explain the present invention and are not intended to limit the present invention.

Before the specific embodiments of the present invention are described, two concepts are briefly explained first.

Regenerative braking: when an electric lift brakes, an (walking) electric motor can be controlled to operate as a generator, so that kinetic energy or potential energy of the equipment can be converted into electric energy, which is stored in an energy storage module.

Feedback current: during the regenerative braking process, a driver converts electric energy generated by the (walking) electric motor into a current that can be used by the energy storage module or other energy consuming components. This current is called the feedback current.

Considering that an aerial equipment is not equipped with a mechanical friction brake and its working conditions, an electric motor generates the pulse feedback current at a higher frequency, and this pulse feedback current is much greater than the pulse feedback current of a passenger vehicle. The prior art is far from being able to reduce the pulse charging current to meet the requirements for the use of the aerial equipment. Therefore, in the embodiment of the present invention, a strategy of restraining the pulse feedback current from charging the battery and maximally absorbing feedback energy is adopted, and the risk caused by higher pulse charging to the aerial equipment is solved on the premise of not affecting the use of the equipment (by the way of not heating and limiting electricity generation power of the electric motor rather than affecting the braking performance).

Figure 1:
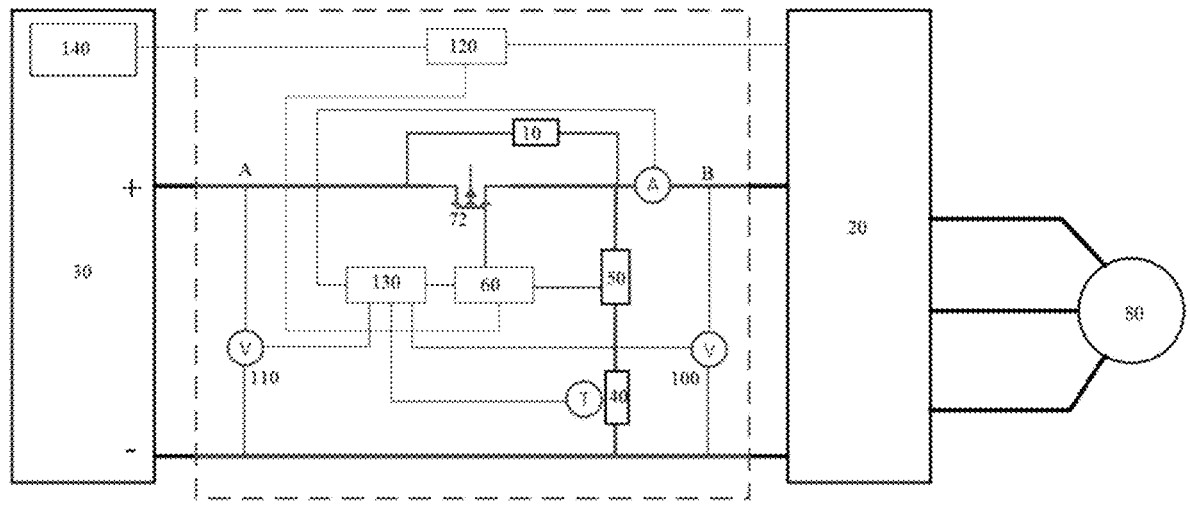
FIG. 1 is a schematic structural diagram of a feedback current control device according to an embodiment of the present invention.
Figure 2:
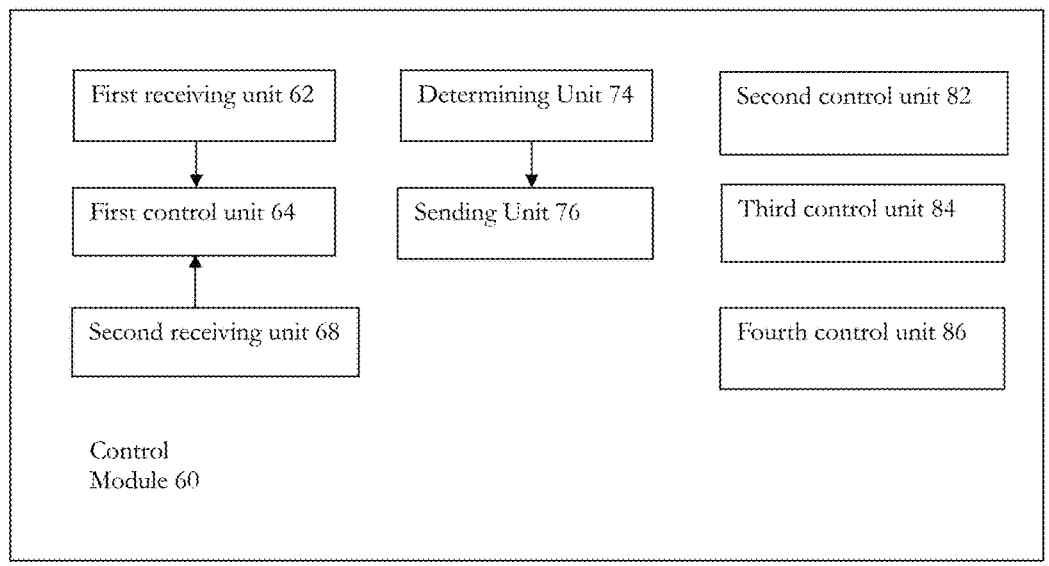
FIG. 2 is a structural diagram of a control module according to an embodiment of the present invention.

FIG. 1 is a structural diagram of a feedback current control device according to an embodiment of the present invention. As shown in FIG. 1, a power circuit between a driver 20 and a battery 30 may include: a feed circuit for the battery 30 to supply electricity to the driver 20; and a current capture circuit configured to divide a feedback current delivered by the driver 20. The feedback current control device may include: a feedback current capture module 40, located on the current capture circuit and configured to capture the feedback current delivered by the driver 20; a first switch module 50, located on the current capture circuit and configured to turn on or off the current capture circuit; and a control module 60, wherein the control module 60 includes: a first receiving unit 62, configured to receive a first voltage at one end of the driver 20 and a second voltage at one end of the battery 30 on the feed circuit and a temperature of the battery 30; and a first control unit 64, configured to, according to a difference between the first voltage and the second voltage and the temperature of the battery, perform the following operations: controlling the first switch module 50 to turn on the current capture circuit under the condition that the difference between the first voltage and the second voltage is greater than a preset voltage and the temperature of the battery is less than or equal to a preset temperature, such that the feedback current is captured by the feedback current capture module 40, as shown in FIG. 2.

Wherein a first end of the feed circuit is connected to a positive electrode of the driver 20, and the other end of the feed circuit is connected to a positive electrode of the battery 30. One end of the current capture circuit is connected to a point B on the feed circuit (any point on the feed circuit between a current output terminal of a second switch module 10 and the driver 20) (i.e., the positive electrode of the driver), and the other end of the current capture circuit is connected to a negative electrode of the battery, which is used for restraining a pulse feedback current from being charged to the battery when the battery is at low temperature, thereby preventing the battery from lithium precipitation, meanwhile, maximally absorbing the feedback energy, saving the energy and prolonging the battery life of equipment.

Specifically, when the temperature of the battery is lower than the preset temperature (for example, 0° C.), the generated feedback energy (feedback current) is completely converted into thermal energy by the feedback current capture module 40 (for example, a braking resistor 42) to be consumed, and may not be delivered to the battery (may not charge the battery). Hence, in the embodiment, when the battery is at low temperature (for example, the temperature of the battery is less than 0° C.), the battery does not need to be heated, which thereby does not affect the user's operation experience, and is beneficial to prolonging the battery life of the aerial equipment. Since the battery does not need to be heated, a user can operate equipment without waiting for the battery to be preheated, which makes the equipment more convenient to operate. In addition, when the equipment works, the temperature of the battery can be maintained to be 0° C. or above without consuming the energy of the battery, so that the consumption of electric energy is reduced, which is conducive to saving energy and prolonging the battery life of the equipment.

The power circuit further includes: a charging circuit for the driver to deliver the feedback current to the battery. The charging circuit is connected in parallel with the feed circuit, so as to form a main circuit between the driver and the battery. Correspondingly, the feedback current control device further includes: a second switch module 10. The second switch module 10 is located on the charging circuit and configured to turn on or off the charging circuit. To (completely) capture the feedback currents by the above process, it is required to control the second switch module 10 to turn off the charging circuit in advance and then perform the above process of capturing the feedback currents.

When the battery is at room temperature, there may be a risk of overcharging if a fully charged battery is charged, and overcharging may easily cause lithium precipitation and thermal runaway of the battery. When an aerial equipment goes downhill at high speed, potential energy of equipment is converted into kinetic energy, and the excess kinetic energy is converted into electric energy which is used to charge the battery. For a fully charged battery, this long-time charging may result in overcharging the battery. In order to avoid overcharging, in the embodiment, the first switch module disposed on the current capture circuit is used to regulate the charging current of the charging circuit.

Figure 3:
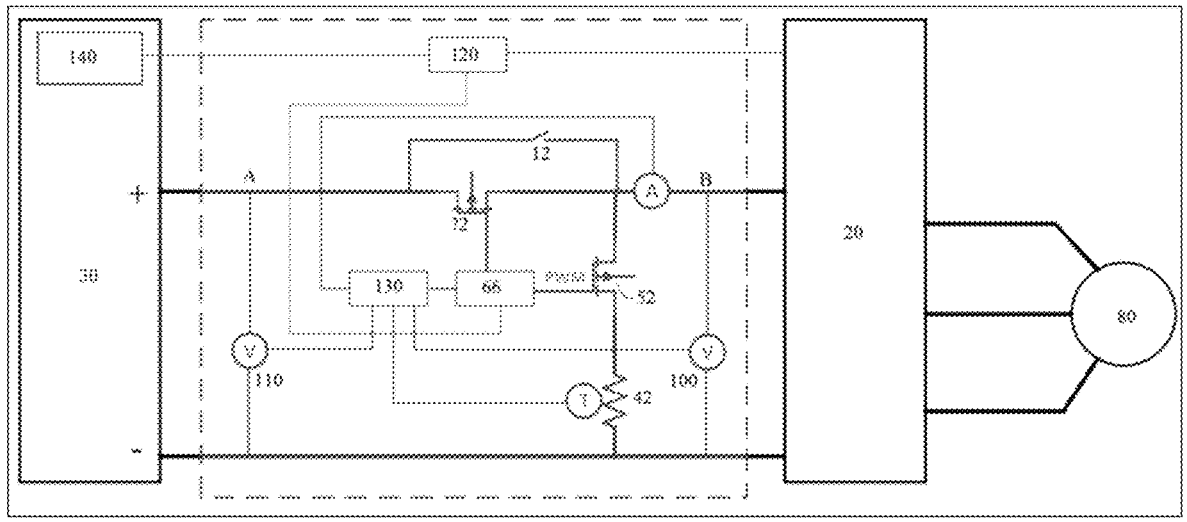
FIG. 3 is a schematic structural diagram of a feedback current control device according to an embodiment of the present invention.
Figure 4:
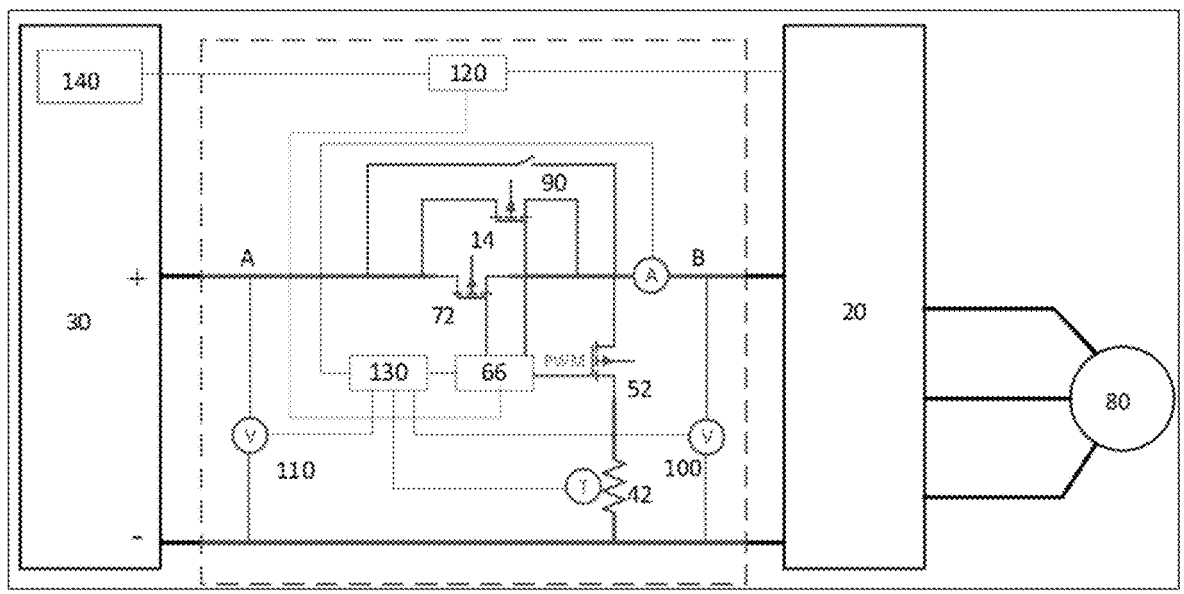
FIG. 4 is a schematic structural diagram of a feedback current control device according to an embodiment of the present invention.

Specifically, the control module 60 further includes: a second receiving unit 68, configured to receive a present allowable charging current of the battery 30. The present allowable charging current may be determined according to a present SOC (State of Charge) of the battery 30. Correspondingly, the first control unit 64 is further configured to, under the condition that the difference between the first voltage and the second voltage is greater than the preset voltage (for example, 0.3 V) and the temperature of the battery is greater than the preset temperature (for example, 0° C.), perform the following operations: controlling the second switch module 10 to turn on the charging circuit; and controlling the first switch module 50 to turn on the current capture circuit, and controlling the driver 20 to charge the battery 30 with the present allowable charging current and through the charging circuit by regulating on-off time of the first switch module 50. The first switch module 50 may be a second field-effect transistor 52 (which may be referred to as an MOS transistor 52, as shown in FIG. 3 or FIG. 4).

Wherein the difference between the first voltage and the second voltage being greater than the preset voltage indicates that an electric motor generates a heavy feedback current, and the temperature of the battery being greater than the preset temperature (for example, 0° C.) indicates that charging the battery at the moment may not pose a risk of lithium precipitation. In this case, the control module 60 (for example, CPU 66) may be used to control a pulse-width modulation (PWM) duty cycle by adopting a PI control algorithm, so as to control the on-off time of the MOS transistor 52, thereby realizing the precise division control on the feedback current and further ensuring that the charging current of the charging circuit is equal to the present allowable charging current of the battery (which may be determined according to actual requirements, and may be a preset percentage of a maximum present allowable charging current corresponding to the present SOC (for example, any value from 80% to 100%, specifically 98%)). Therefore, in the embodiment, the battery may be charged according to the current allowable charging current (as close as possible to the maximum present allowable charging current but not exceeding the maximum present allowable charging current), and the excess feedback energy is consumed by the feedback current capture module 40 on the current capture circuit, which avoids the overcharging phenomenon and thereby is beneficial to prolonging the battery life.

Wherein the feedback current capture module 40 may be an energy consumption module (not shown) or an energy storage module (not shown). Specifically, the energy consumption module (not shown) may be a braking resistor 42, as shown in FIG. 3 or FIG. 4. Wherein the braking resistor 42 needs to not only satisfy the requirement of a braking distance, but also ensure that a regenerated electromotive force is less than a protection voltage of the driver, and its value may be determined according to existing algorithms. The energy storage module (not shown) may be a supercapacitor (not shown) or a storage battery (not shown). In an embodiment, the feedback current capture module 40 adopts the braking resistor 42, which has the advantages of low cost and small size (easy installation on an aerial equipment with a limited space). In another embodiment, the feedback current capture module 40 adopts an energy storage module, which has the following advantages: after the feedback energy is absorbed, the feed circuit may supply electricity to the battery, which makes the energy utilization rate higher and is more conducive to saving energy and prolonging the battery life of the equipment.

The feedback current control device may further include: a third switch module 70. The third switch module 70 is located on the feed circuit, connected in parallel with the second switch module 10, and configured to unidirectionally turn on the feed circuit so as to only allow the battery 30 to supply electricity to the driver 20. That is, the third switch module 70 on the feed circuit is mainly used to realize the charging function; and the second switch module 10 on the charging circuit is mainly used to block the pulse charging current.

Wherein the second switch module 10 may be a contactor 12 (as shown in FIG. 3), a combination of a first diode (not shown) and a contactor (not shown) connected in series, or a first field-effect transistor 14 (which may be referred to as an MOS transistor 14, as shown in FIG. 4). Specifically, under the condition that the second switch module 10 is the first field-effect transistor 14, the first field-effect transistor 14 has a first chip. Correspondingly, the control module 60 may further include: a second control unit 82, configured to, under the condition that the third switch module 70 fails, control the first chip of the first field-effect transistor 14 to unidirectionally turn on the charging circuit so as to only allow the battery 30 to supply electricity to the driver 20.

Wherein the third switch module 70 is a second diode (not shown) or a third field-effect transistor 72 (as shown in FIG. 3 or FIG. 4). The third field-effect transistor 72 has a second chip. Correspondingly, the control module 60 may further include: a third control unit 84, configured to control the second chip of the third field-effect transistor 72 (which may be referred to as an MOS transistor 72) to unidirectionally turn on the feed circuit so as to only allow the battery 30 to supply electricity to the driver 20. In an embodiment, the third switch module 70 is a second diode (not shown), which has the advantage of low cost. In another embodiment, the third switch module 70 is a third field-effect transistor 72 (as shown in FIG. 3 or FIG. 4), which has the following advantages: the size is smaller, which is beneficial to the arrangement of a circuit board; and an internal resistance is smaller: when the current of the feed circuit is heavier, the voltage drop is smaller (thereby less heat is generated), so less feedback energy is dissipated.

A brief description will be given by taking the feedback current control device shown in FIG. 3 as an example. On the main circuit (i.e., a power loop) between the driver 20 and the battery 30, the contactor 12 and the MOS transistor 72 connected in parallel are arranged; and on the current capture circuit for capturing the feedback current, the MOS transistor 52 and the braking resistor 42 are arranged.

The MOS transistor 72 is configured with a dedicated control chip, which has the characteristic of unidirectional conduction of a diode and can prevent the feedback current from flowing to the battery from the driver. The contactor 12 is controlled to be on or off by the CPU 66. In normal cases (i.e., when the SOC is greater than the preset percentage or the temperature of the battery is less than or equal to the preset temperature, for example, when SOC>95% (the preset percentage may be other reasonable values, for example, 90%) or the temperature of the battery is less than or equal to 0° C. (the preset temperature may be other reasonable values, and may be set according to actual needs)), an off state is present. When the temperature of the battery is greater than the preset temperature (for example, 0° C.), that is, when the feedback current is allowed to be delivered to the battery 30 (the battery is in a state of being charged), the contactor 12 is controlled to turn on the charging circuit where the contactor 12 is located, so that the feedback current can flow from the driver 20 to the battery 30 through the charging circuit. In the meanwhile, in order to prevent the current flowing to the battery 30 from being too heavy (for example, exceeding the present allowable charging current of the battery 30), the CPU 66 may be used to control the PWM duty cycle by the PI control algorithm to regulate the on-off time of the MOS transistor 52, thereby controlling the driver 20 to charge the battery 30 with the present allowable charging current.

A brief description will be given by taking the feedback current control device shown in FIG. 4 as an example. On the main circuit (i.e., a power loop) between the driver 20 and the battery 30, the MOS transistor 14 and the MOS transistor 72 connected in parallel are arranged. The MOS transistor on the power loop adopts a redundant design, that is, two MOS transistors are connected in parallel with each other and then connected in series in the power loop. When the aerial equipment is under heavy current conditions (for example, in a state of climbing a slope with a certain angle (for example, 45 degrees)), the redundant design can reduce the voltage drop in the power loop, which thereby not only can lower the temperature of the MOS transistor so as to prolong the service life of the MOS transistor, but also can avoid the consumption of the feedback energy such that the battery can maximally absorb the braking energy. Moreover, on the current capture circuit for capturing the feedback current, the MOS transistor 52 and the braking resistor 42 are arranged.

In an embodiment, the MOS transistor 72 is configured with a dedicated control chip, which has the characteristic of unidiretional conduction of a diode and can prevent the feedback current from flowing to the battery from the driver. The MOS transistor 14 is controlled to be on or off by the CPU 66. In normal cases, an off state is present. When the temperature of the battery is greater than the preset temperature (for example, 0° C.), that is, when the feedback current is allowed to be delivered to the battery 30 (the battery is in a state of being charged), the MOS transistor 14 is controlled to turn on the charging circuit where the MOS transistor 14 is located, so that the feedback current can flow from the driver 20 to the battery 30 through the charging circuit. In the meanwhile, in order to prevent the current flowing to the battery 30 from being too heavy (for example, exceeding the present allowable charging current of the battery 30), the CPU 66 may be used to control the PWM duty cycle by the PI control algorithm to regulate the on-off time of the MOS transistor 52, thereby controlling the driver 20 to charge the battery 30 with the present allowable charging current.

In another embodiment, the MOS transistor 72 is configured with a dedicated control chip, which has the characteristic of unidirectional conduction of a diode and can prevent the feedback current from flowing to the battery from the driver. When the feedback current control device is under normal operating conditions, the MOS transistor 14 may play the same role as the MOS transistor 14 in the previous embodiment, that is, may allow the driver 20 to charge the battery 30 with the present allowable charging current. However, under the condition that the MOS transistor 72 fails, since the MOS transistor 14 is also configured with a dedicated control chip which has the characteristic of unidirectional conduction of a diode, the CPU 66 may be used to control the chip to unidirectionally turn on the charging circuit where the MOS transistor 14 is located. Thereby, on the one hand, the battery 30 can continue supplying electricity to the driver 20, and on the other hand, the feedback current can be prevented from flowing from the driver to the battery. When the temperature of the battery is greater than the preset temperature (for example, 0° C.), operations similar to those in the previous embodiment may be performed, and details will not be repeated here.

In the above embodiment, the feedback current control device has a braking control function, which can effectively restrain damage to the battery caused by the pulse feedback current when the battery is at low temperature. That is, when the aerial equipment slows down or goes downhill, if the temperature of the battery 30 is lower than the preset temperature (for example, 0° C.), the feedback current is blocked by the MOS transistor 72 and cannot flow to the battery, thereby effectively restraining the phenomenon of charging with the pulse feedback current when the battery is at low temperature, greatly reducing the probability of lithium precipitation of the battery and the risk of thermal runaway of the battery and enhancing the safety of the battery.

On the premise of satisfying a minimum braking distance, a maximum value of the pulse feedback current is reduced as much as possible, so as to flatten the waveforms of the pulse feedback current, thereby reducing the impact on the battery. In the embodiment of the present invention, an electricity generation current of the electric motor may be controlled. The details are given in the description below.

The control module 60 may further include: a determining unit 74, configured to determine an electricity generation current of an electric motor 80 according to a target speed and an actual speed of the electric motor 80 and braking time of the aerial equipment; and a sending unit 76, configured to send the determined electricity generation current to the driver 20, so as to allow the driver 20 to control the electric motor 80 to generate electricity with the electricity generation current.

The determining unit 74 configured to determine the electricity generation current may include: determining that the electricity generation current is a maximum electricity generation current under the condition that the target speed, the actual speed and the braking time satisfy a preset condition, wherein the preset condition is that the braking time is less than preset braking time or a difference between the target speed and the actual speed is greater than a preset speed difference; or determining the electricity generation current according to a minimum electricity generation current, a maximum allowable braking time and a maximum electricity generation current under the condition that the target speed, the actual speed and the braking time do not satisfy the preset condition.

Wherein the minimum electricity generation current means that electricity generation with the current can satisfy the minimum braking distance under non-extreme conditions (for example, running at a speed of 6 km/h on a flat ground). The minimum electricity generation current may usually be expressed as a percentage of the maximum electricity generation current.

Wherein the determining unit 74 configured to determine the electricity generation current according to the minimum electricity generation current, the maximum allowable braking time and the maximum electricity generation current may include: determining the electricity generation current according to the minimum electricity generation current $I_{min}$, the maximum allowable braking time $T_{max}$, the maximum electricity generation current $I_{max}$ and the following formula (1), $$I = \left[1 - \frac{(I_{min} - 1)(t - 1)}{(T_{max} - 1)}\right] \times I_{max}, \quad (1)$$

where the values of the $I_{max}$, $I_{min}$ and $T_{max}$ need to be determined according to a specific vehicle models and working conditions, and t is the braking time (which can be set in advance according to actual needs).

Specifically, the electricity generation current may be calculated according to the following rules.

When the braking time is less than 1 s (for example, the preset braking time), the electricity generation current=100% $I_{max}$. A sudden stop operation usually requires a short braking distance and thereby the maximum braking power is required. Usually, the electricity generation current for the sudden stop operation is set to be 100% $I_{max}$.

When the difference between the target speed and the actual speed is large (for example, the difference may be 500 rpm, and the preset speed difference may be 200 rpm (but this preset speed is not limited to 200 rpm)), the electricity generation current=100% $I_{max}$. At the moment, the resistance of the aerial equipment is large, the aerial equipment may be go uphill, and kinetic energy that can be converted into electric energy decreases. The generated power is not high, so the peak feedback current is not high.

In other cases, the electricity generation current may be calculated according to the above formula (1).

After the electricity generation current is calculated, the control module 60 sends the electricity generation current to the driver 20 through a CAN bus, and the driver 20 controls the electric motor 80 to generate electricity with the electricity generation current. Thus, in the embodiment, without affecting the braking performance, the feedback energy can be controlled to be output smoothly, the impact feedback current is decreased, and thereby, the impact on the battery is effectively alleviated.

Under the condition that the second switch module 10 and the third switch module 70 both fail, an aerial equipment under normal working conditions cannot be moved to an emergency maintenance station and repaired by relevant maintenance personnel since the battery 30 cannot supply electricity to the aerial equipment.

In the embodiment of the present invention, a bypass switch connected in parallel with the second switch module may be further provided, and supplying electricity to the driver from the battery may be maintained by closing the bypass switch. Specifically, the feedback current control device may further include: a bypass switch 90. The bypass switch 90 is connected in parallel with the second switch module 10, as shown in FIG. 4. Correspondingly, the control module 60 may further include: a fourth control unit 86, configured to, under the condition that the second switch module 10 and the third switch module 70 both fail, control the bypass switch 90 to be closed such that the battery 30 supplies electricity to the driver 20.

Of course, the control units (for example, the first control unit, the second control unit, the third control unit and the fourth control unit) in the above embodiments may be independent control units, or may be integrated in a same control unit.

The feedback current control device may further include: a first voltage sensor (not shown), configured to acquire the first voltage at one end of the driver 20 on the main circuit; and a second voltage sensor (not shown), configured to acquire the second voltage at one end of the battery 30 on the main circuit. The first voltage sensor (not shown) and the second voltage sensor (not shown) may be a voltmeter 100 and a voltmeter 110 respectively.

Figure 5:
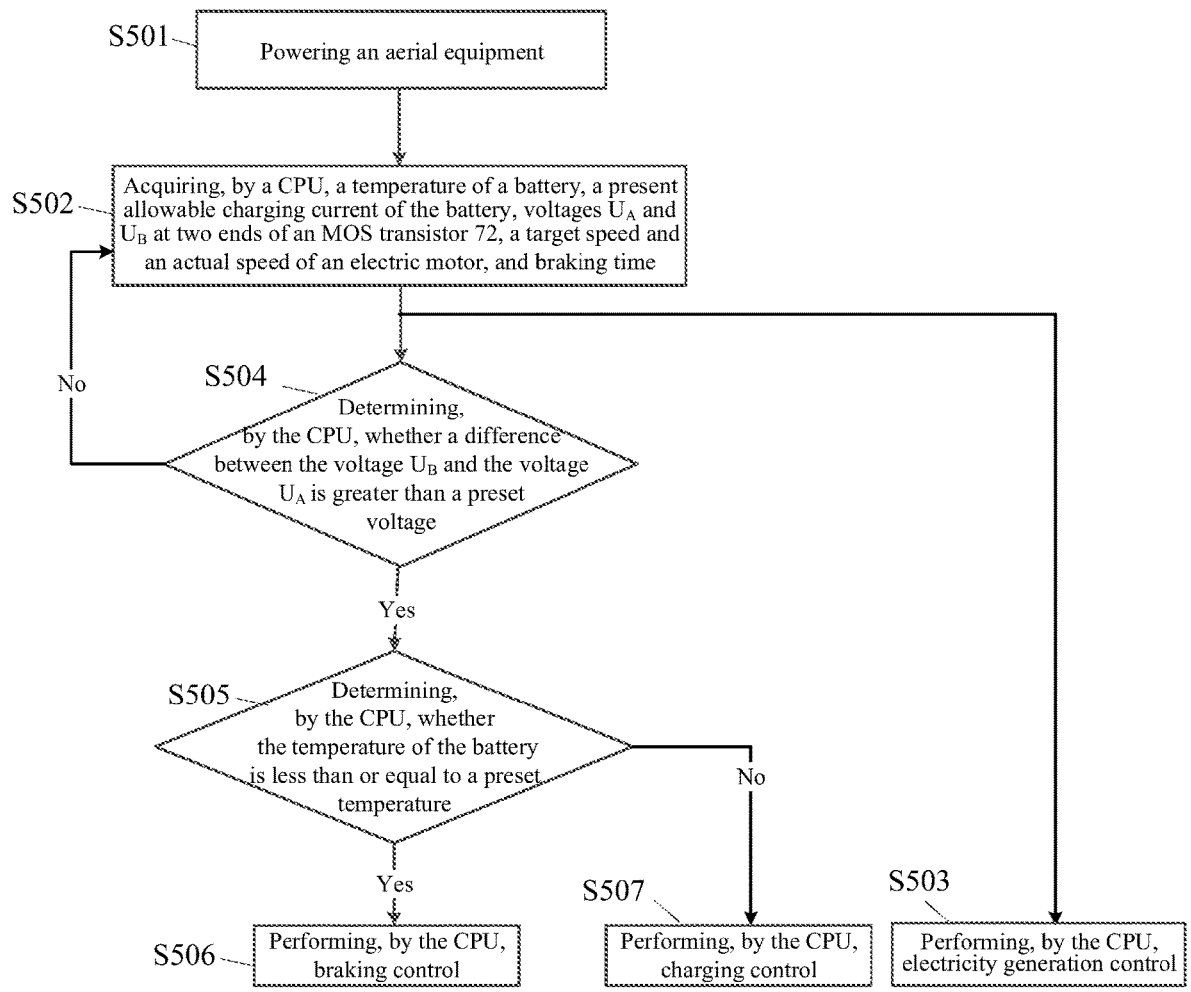
FIG. 5 is a flow chart of a charging control process for a battery according to an embodiment of the present invention.

Specifically, a charging control process for the battery is explained and described below by taking the feedback current control device shown in FIG. 4 as an example, as shown in FIG. 5.

As shown in FIG. 5, the charging control process for the battery may include steps S501-S508 as follows.

In step S501, powering an aerial equipment.

In step S502, acquiring, by a CPU, a temperature of a battery, a present allowable charging current of the battery, voltages UA and UB at two ends of an MOS transistor 72, a target speed and an actual speed of an electric motor, and braking time.

The CPU 66 acquires state information of the battery 30 through a CAN controller 120, which includes a temperature of the battery 30, a real-time SOC of the battery 30 and an allowable charging current in this real-time SOC (present allowable charging current for short). The state information is provided by a BMS (battery management system) 140 of the battery 30. The CPU 66 acquires a voltage (UA) at a front end of an MOS transistor 72, a voltage (UB) at a rear end of the MOS transistor 72, a target speed and an actual speed of an electric motor 80, and braking time (also referred to as slowing-down time) of an aerial equipment from an A/D converter 130.

In step S503, performing, by the CPU, electricity generation control.

Electricity generation control: the CPU 66 may determine an electricity generation current of the electric motor 80 according the target speed and the actual speed of the electric motor 80 and the braking time of the aerial equipment (for the specific process, reference can be made to the description above, and details will not be repeated here); and then the CPU 66 sends the determined electricity generation current to a driver 20, and the driver 20 controls the electric motor 80 to generate electricity based on the electricity generation current.

The purpose of controlling the electricity generation current is to reduce a maximum value of the pulse feedback current as much as possible while satisfying the minimum braking distance so as to flatten the waveform of the pulse feedback current, thereby reducing the impact on the battery and facilitating the precise control of the control system. Another benefit of controlling the electricity generation current is that a peak voltage at a point B can be suppressed, thereby avoiding the overvoltage alarm of the driver.

In step S504, determining, by the CPU, whether a difference between the voltage UB and the voltage UA is greater than a preset voltage, if so, step S505 is performed; otherwise, step S502 is performed again.

If the difference between the voltage UB and the voltage UA is greater than the preset voltage (for example, 0.3 V), it indicates that the electric motor generates a heavy feedback current, and then step S505 needs to be further performed to determine, according to the temperature of the battery, whether the battery can be charged, otherwise, it indicates that the electric motor does not generate a heavy feedback current, and step S502 is performed again.

In step S505, determining, by the CPU, whether the temperature of the battery is less than or equal to a preset temperature, if so, step S506 is performed, otherwise, step S507 is performed.

If the difference between the voltage UB and the voltage UA is greater than the preset voltage (for example, 0.3 V) and the temperature of the battery is less than or equal to the preset temperature (for example, 0° C.), it indicates that charging the battery at the moment may pose a risk of lithium precipitation. At the moment, step S506 is performed to perform braking control. That is, the heavy feedback current is diverted to the current capture circuit, and the feedback current is consumed, for example, through a braking resistor 42, that is, charging is not performed on the battery 30.

If the difference between the voltage UB and the voltage UA is greater than the preset voltage (for example, 0.3 V) and the temperature of the battery is greater than the preset temperature (for example, 0° C.), it indicates that charging the battery at the moment may not pose a risk of lithium precipitation. At the moment, step S507 is performed to perform the charging control. That is, the battery is charged with the limited charging current.

In step S506, performing, by the CPU, braking control.

When the difference between the voltage UB and the voltage UA is greater than the preset voltage (for example, 0.3 V) and the temperature of the battery is less than or equal to the preset temperature (for example, 0° C.), braking control is enabled.

Braking control: the CPU 66 controls an MOS transistor 14 to turn off the charging circuit, and controls an MOS transistor 52 to turn on the current capture circuit (i.e., a braking loop). At the moment, all the feedback currents are consumed by the braking resistor 42, thereby avoiding charging the battery. The purpose of the braking control is to prevent the risk of lithium precipitation of the battery caused by the pulse feedback current at low temperature.

In step S507, performing, by the CPU, charging control.

When the difference between the voltage UB and the voltage UA is greater than the preset voltage (for example, 0.3 V) and the temperature of the battery is greater than the preset temperature (for example, 0° C.), charging control is enabled.

Charging control: the CPU 66 controls the MOS transistor 14 to turn on the charging circuit, controls the MOS transistor 52 to turn on the current capture circuit (i.e., a braking loop), and meanwhile, controls on-off time of the MOS transistor 7 by controlling a PWM duty cycle by a PI control algorithm by taking the present allowable charging current of the battery as a target value, thereby regulating the current division of the feedback current in the current capture circuit, i.e., realizing precise control on the braking current, and finally ensuring that the charging current is equal to the present allowable charging current of the battery. The purpose of the charging control is to avoid overcharging.

In conclusion, in an inventive way, the first switch module is controlled to turn on the feedback current capture module to capture the feedback current under the condition that the difference between the first voltage at one end of the driver and the second voltage at one end of the battery on the feed circuit is greater than the preset voltage and the temperature of the battery is less than the preset temperature (for example, 0° C.). Thereby, when charging is performed at low temperature, the feedback current capture module can capture all the feedback currents, so that the risk of lithium precipitation of the battery caused by the pulse feedback current when charging is performed at low temperature can be effectively avoided, thereby greatly reducing the probability of lithium precipitation of the battery and the risk of thermal runaway of the battery and enhancing the safety of the battery.

An embodiment of the present invention further provides an aerial equipment, including: the feedback current control device.

For specific details and benefits of the aerial equipment in the embodiment of the present invention, reference can be made to the above description for the feedback current control device, which will not be repeated here.

The preferred embodiments of the present invention have been described in detail above in conjunction with the accompanying drawings, but the present invention is not limited to the specific details in the above embodiments, and various simple variations may be made to the technical solutions of the present invention within the scope of the technical idea of the present invention. These simple variations are all within the protection scope of the present invention.

It should be further noted that the specific technical features described in the above specific embodiments may be combined in any suitable manner in the case of no contradiction. In order to avoid unnecessary repetition, various possible combinations of the present invention will not be further described.

In addition, any combination of the various embodiments of the present invention can be made as long as it does not deviate from the idea of the present invention, and it should also be regarded as the contents disclosed by the present invention.

The invention claimed is:

1. A feedback current control device, wherein a power circuit between a driver and a battery comprises: a feed circuit configured to supply electricity to the driver from the battery; and a current capture circuit configured to divide a feedback current delivered by the driver, and the feedback current control device comprises:
a feedback current capture module, located on the current capture circuit and configured to capture the feedback current;
a first switch module, located on the current capture circuit and configured to turn on or off the current capture circuit; and
a control module, comprising:
a first receiving unit, configured to receive a first voltage at one end of the driver and a second voltage at one end of the battery on the feed circuit and a temperature of the battery; and
a first control unit, configured to, according to a difference between the first voltage and the second voltage and the temperature of the battery, to perform the following operations:
controlling the first switch module to turn on the current capture circuit under the condition that the difference between the first voltage and the second voltage is greater than a preset voltage and the temperature of the battery is less than or equal to a preset temperature, such that the feedback current is captured by the feedback current capture module.

2. The feedback current control device according to claim 1, wherein the power circuit further comprises: a charging circuit configured to deliver feedback current to the battery by the driver, the charging circuit being connected in parallel with the feed circuit,
the feedback current control device further comprises: a second switch module, located on the charging circuit and configured to turn on or off the charging circuit,
the control module further comprises: a second receiving unit, configured to receive a present allowable charging current of the battery, and
the first control unit is further configured to, under the condition that the difference between the first voltage and the second voltage is greater than the preset voltage and the temperature of the battery is greater than the preset temperature, to perform the following operations:
controlling the second switch module to turn on the charging circuit; and
controlling the first switch module to turn on the current capture circuit, and controlling the driver to charge the battery with the present allowable charging current and through the charging circuit by regulating on-off time of the first switch module.

3. The feedback current control device according to claim 2, further comprising:
a third switch module, located on the feed circuit, connected in parallel with the second switch module, and configured to unidirectionally turn on the feed circuit so as to only allow the battery to supply electricity to the driver.

4. The feedback current control device according to claim 3, wherein the second switch module is a contactor, a combination of a first diode and a contactor connected in series, or a first field-effect transistor.

5. The feedback current control device according to claim 4, wherein the first field-effect transistor has a first chip, and the control module further comprises: a second control unit, configured to, under the condition that the third switch module fails, control the first chip of the first field-effect transistor to unidirectionally turn on the charging circuit so as to only allow the battery to supply electricity to the driver.

6. The feedback current control device according to claim 3, wherein the first switch module is a second field-effect transistor; and the third switch module is a second diode or a third field-effect transistor, wherein the third field-effect transistor has a second chip, and the control module further comprises: a third control unit, configured to control the second chip of the third field-effect transistor to unidirectionally turn on the feed circuit so as to only allow the battery to supply electricity to the driver.

7. The feedback current control device according to claim 3, wherein the feedback current control device further comprises:

a bypass switch, wherein the bypass switch is connected in parallel with the second switch module, and the control module further comprise: a fourth control unit, configured to, under the condition that the second switch module and the third switch module both fail, control the bypass switch to be closed such that the battery supplies electricity to the driver.

8. The feedback current control device according to claim 1, wherein the control module further comprises:

a determining unit, configured to determine an electricity generation current of an electric motor according a target speed of the electric motor, an actual speed of the electric motor and braking time of an aerial equipment; and a sending unit, configured to send the determined electricity generation current to the driver, so as to allow the driver to control the electric motor to generate electricity with the electricity generation current.

9. The feedback current control device according to claim 8, wherein the determining unit configured to determine the electricity generation current comprises:

determining that the electricity generation current is a maximum electricity generation current under the condition that the target speed, the actual speed and the braking time satisfy a preset condition, wherein the preset condition is that the braking time is less than preset braking time or a difference between the target speed and the actual speed is greater than a preset speed difference; or determining the electricity generation current according to a minimum electricity generation current, a maximum allowable braking time and the maximum electricity generation current under the condition that the target speed, the actual speed and the braking time do not satisfy the preset condition.

10. The feedback current control device according to claim 1, wherein the feedback current capture module is an energy consumption module or an energy storage module.

11. The feedback current control device according to claim 10, wherein the energy consumption module is a braking resistor.

12. An aerial equipment, comprising: the feedback current control device according to claim 1.

* * * * *